United States Patent [19]

Pommier

[11] 4,271,889
[45] Jun. 9, 1981

[54] TIRE WITH ASYMMETRIC RADIAL CARCASS EMPLOYING BLOCKS TO LIMIT CARCASS SWING AND CARCASS EXPANSION

[75] Inventor: Jean Pommier, Clermont-Ferrand, France

[73] Assignee: Compagnie Generale des Etablissements Michelin, Clermont-Ferrand, France

[21] Appl. No.: 117,026

[22] Filed: Jan. 30, 1980

Related U.S. Application Data

[63] Continuation-in-part of Ser. No. 19,108, Mar. 9, 1979, abandoned.

[30] Foreign Application Priority Data

Mar. 10, 1978 [FR] France .................................. 78 07390

[51] Int. Cl.³ .............................. B60C 9/08; B60C 9/20
[52] U.S. Cl. ........................... 152/353 R; 152/354 R;
152/359; 152/361 FP; 152/361 DM
[58] Field of Search .......... 152/352 R, 352 A, 353 R, 152/354 R, 361 R, 361 FP, 361 DM, 359

[56] References Cited

U.S. PATENT DOCUMENTS

| | | | |
|---|---|---|---|
| 2,884,040 | 4/1959 | Boussu et al. | 152/356 |
| 3,018,814 | 1/1962 | Saint-Paul | 152/361 FP |
| 3,515,197 | 6/1970 | Boileau | 152/361 R |
| 3,656,532 | 4/1972 | Roberts | 152/353 |
| 3,899,015 | 8/1975 | Gebert et al. | 152/361 FP |
| 4,006,766 | 2/1977 | Takayanagi et al. | 152/354 |
| 4,016,916 | 4/1977 | Ravagnani | 152/361 R |

FOREIGN PATENT DOCUMENTS 808824  2/1959  United Kingdom ................ 152/361

*Primary Examiner*—Caleb Weston
*Assistant Examiner*—Lois E. Boland
*Attorney, Agent, or Firm*—Brumbaugh, Graves, Donohue & Raymond

[57] ABSTRACT

A tire with an asymmetric radial carcass reinforcement is improved due to the fact that on the side of the median plane of the beads which corresponds to the sidewall having the greatest curvature there is arranged a block for limiting the swing of the crown, this swing-limiting block being interposed between the radial carcass reinforcement and the tread reinforcement in the zone of parallelism between these two reinforcements. An expansion-limiting block is arranged on the other side of the median plane of the beads.

35 Claims, 6 Drawing Figures

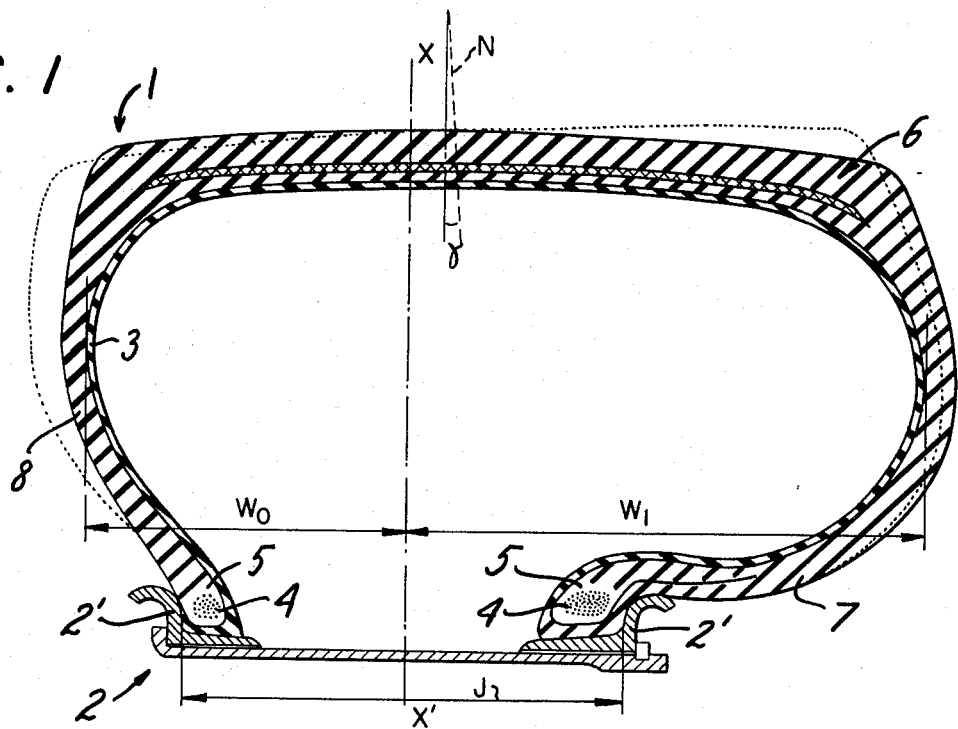
FIG. 1
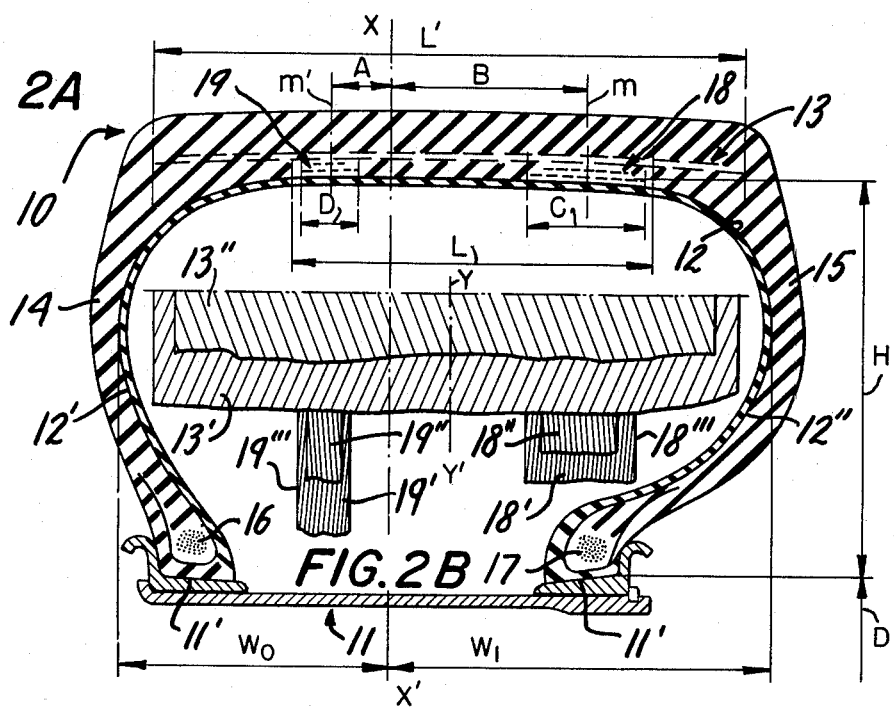
FIG. 2A
FIG. 2B
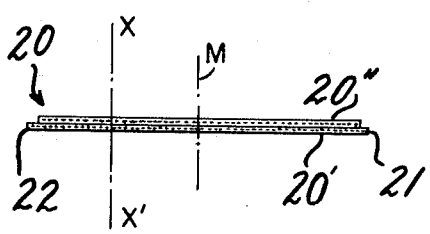
FIG. 3
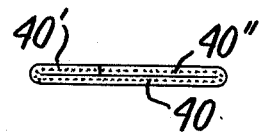
FIG. 4
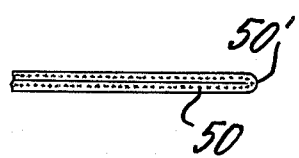
FIG. 5

TIRE WITH ASYMMETRIC RADIAL CARCASS EMPLOYING BLOCKS TO LIMIT CARCASS SWING AND CARCASS EXPANSION

This application is a continuation-in-part application of U.S. application Ser. No. 19,108, filed Mar. 9, 1979, now abandoned.

The present invention relates to improvements in tires with a radial carcass reinforcement anchored on both sides to at least one bead ring and with a tread reinforcement of slight meridian curvature which is parallel to the radial carcass reinforcement along a zone of a width less than or equal to that of the tread reinforcement and formed of at least two superimposed plies of wires or cables which are parallel to each other in each ply and crossed from one ply to the other forming angles at most equal to 45° with the longitudinal direction of the tire.

More particularly, the present invention relates to tires of the above-indicated type which have sidewalls which are asymmetric with respect to the median plane of the beads, such that, for instance, the developed length of one sidewall or of the corresponding portion of the radial carcass reinforcement is greater than that of the other sidewall.

Such an arrangement is necessary, in particular, when it is desired to increase the load carried by the tire, that is to say the volume of the pneumatic cavity, and when the space taken up by the tire in the radial direction towards the outside of the axis of rotation of the tire and in the axial direction towards the inside of the vehicle is limited by the structure of the vehicle and/or the width of the rim. The sole possibility consists of increasing the width of the tire solely in the axial direction towards the outside of the vehicle, that is to say with respect to the median plane of the beads of the tire. Thus the partial volume of the pneumatic cavity located axially on one side is greater than the partial volume located axially on the other side of the median plane of the beads. Such cases occur for certain heavy vehicles intended to travel at least in part off the road.

However, the adoption of this solution entails drawbacks. Under the effect of the inflation pressure, each sidewall tends to assume a meridian profile which is specific to it and causes the swinging of the crown of the tire in the direction towards the median plane of the beads. Thus it is impossible to respect the radial dimensioning desired. The tread reinforcemment is subjected, due to the maximum radial expansion of the radial carcass reinforcement, to excessive stresses which prematurely destroy the tread reinforcement.

It has been proposed (U.S. Pat. No. 3,656,532) to limit the swinging of the crown by further stiffening the radially inner half of the corresponding sidewall. However, such a structure does not appear to have the desired endurance.

The object of the present invention is to overcome the drawbacks described above.

Accordingly the invention, applied to tires with asymmetric sidewalls with respect to the median plane of the beads, of the type in question, is characterized by the fact that it contemplates the provision, parallel to the radial carcass reinforcement and between the radial carcass reinforcement and the tread reinforcement, and preferably along zones included within the zone along which the tread reinforcement is parallel to the radial carcass reinforcement, of a swing-limiting block and an expansion-limiting block which are each formed of at least one ply of wires or cables of low extensibility parallel to the longitudinal direction or preferably each formed of two superimposed plies of wires or cables of low extensibility which are parallel to each other in each ply and crossed from one ply to the other forming with the longitudinal direction angles of opposite sign, each being both other than zero and less in absolute value than one-half of the smallest angle used in the tread reinforcement, the longitudinal median axis of the swing-limiting block being located axially on the side of the median plane of the beads of the tire corresponding to the sidewall in which the radial carcass reinforcement reaches its greatest maximum axial distance from the median plane of the beads, the longitudinal median axis of the expansion-limiting block being located axially on the side of the median plane of the beads corresponding to the sidewall in which the radial carcass reinforcement reaches its smallest maximum axial distance from the median plane of the beads.

By wires or cables of low extensibility there are understood wires or cables, preferably metallic, for instance of steel, having a relative elongation $\Delta l/l$ less than 0.2% under a load equal to 10% of their rupture load. These cables can be produced with a high cable layer which is between 12 and 20 times the apparent diameter of the cable. These wires or cables are preferably arranged contiguous to each other.

The invention contemplates, on the one hand, the use of a swing-limiting block formed of at least one ply of juxtaposed longitudinal wires or cables. The invention provides, on the other hand, a preferred variant in order to better screen-off the transmission of tensions coming from the pressure of the portion of the radial carcass reinforcement corresponding to the sidewall which reaches the greatest maximum axial distance from the median plane of the beads, taking into account the fact that no ply reinforcemment element, even of steel or of glass fibers, is inextensible in actual practice. This variant, which has already been described above, consists in arranging the reinforcement elements of the two plies of the swing-limiting block at an angle different, in absolute value, from zero with respect to the longitudinal direction. The two crossed plies have in fact a tendency to decrease the meridian curvature of the swing-limiting block under the effect of an internal pressure.

Due to the usse of a swing-limiting block in accordance with the invention, the correct position of the tread reinforcement, seen in meridian section, can be reestablished, and this while avoiding transmitting the tension from the radial carcass reinforcement to the tread reinforcement in the corresponding zone.

In order to increase the life of the tread reinforcement while also avoiding transmitting the tension of the radial carcass reinforcement to the tread reinforcement in the zone of the latter arranged radially to the outside of the portion of the radial carcass reinforcement corresponding to the sidewall which reaches the smallest maximum distance from the median plane of the beads, the expansion-limiting block is arranged radially to the outside of this portion of the carcass reinforcement. The expansion-limiting block satisfies the same general characteristics as to structure and position as the swing-limiting block, without being necessarily identical to the swing-limiting block. Likewise, the expansion-limiting block is preferably formed of two superimposed plies crossed with respect to the longitudinal direction.

The tension T per unit of width measured in the axial direction exerted on a ply radially to the outside of the radial carcass reinforcement can be evaluated in first approximation by means of the formula $$T = p \cdot \frac{R}{2 \cos^2 \alpha}.$$

In this formula, p is the inflation pressure of the tire, R is the radius of the ply with respect to the axis of rotation of the tire, and $\alpha$ is the angle of the cables of the ply with respect to the longitudinal direction of the tire. This formula indicates why the invention, by way of preference, contemplates use in one or both limiting blocks of angles $\alpha$ less than one-half of the smallest angle used in the tread reinforcement (or the sole angle in case of the use of a tread reinforcement with symmetrically crossed plies). Thus, in fact, the tension T of a ply of the limiting block or blocks is always less than the tension of the ply having the smallest angle in the tread reinforcement. The elongation of the limiting blocks under the effect of the tension coming from the inflation pressure acting on the radial carcass reinforcement is thus less. This avoids transmitting this tension to the tread reinforcement and forming shear stresses there due to the inflation of the tire.

The width of the swing-limiting block is preferably between 15% and 60% of the width of the zone of parallelism of the radial carcass and tread reinforcements. The width of the expansion-limiting block is advantageously between 10% and 30% of the width of the zone of parallelism.

The longitudinal median axis of the swing-limiting block is preferably located at an axial distance from the median plane of the beads which is between 10% and 50% of the maximum axial distance of the radial carcass reinforcement of that one of the two sidewalls which has the greatest maximum axial distance from the median plane of the beads.

The invention provides, by way of preferred variant, that the axially outer edge of the swing-limiting block and that of the expansion-limiting block are located axially towards the inside of the zone of parallelism of the radial carcass and tread reinforcements. Preferably these outer edges are arranged at a distance from the edges of the zone of parallelism of the tread and radial carcass reinforcements which is between 0 and 30% of the width of the zone of parallelism. Thus these outer edges are located in regions of the tire which are of little deformability.

The transition between the edges of the swing-limiting block and/or those of the expansion-limiting block and the radial carcass and tread reinforcements can be improved by using, in order to form one and/or the other of these limiting blocks, two plies whose widths differ from each other by at most 10%. One of the limiting blocks or both can also be made of a folded ply whose edges meet along a parallel circle. One can also use a ply which is folded on itself, the edge corresponding to the fold forming preferably the axially outer edge of the limiting block or blocks.

In the drawing, which is intended to illustrate the invention on basis of specific embodiments:

FIG. 1 shows, in radial section, a tire in accordance with the prior art,

FIG. 2A is a view, in radial section, through a tire in accordance with the invention alongside of which in FIG. 2B is a plan view of the plies of wires or cables, essential for an understanding of the invention, and FIGS. 3 to 5 show, also in radial section on a larger scale, embodiments of limiting blocks different from the one shown in FIGS. 2A and 2B.

The radial section of FIG. 1 shows in solid line a tire 1 mounted on a rim 2, but not inflated. This tire 1 has a radial carcass reinforcement 3 anchored by being turned around the bead ring 4 of each of the beads 5 and a tread reinforcement 6 formed of two crossed superimposed plies. The straight line XX' represents the trace of the median plane of the beads 5 on the plane of the drawing. This median plane is at an identical distance from the two rim flanges 2'. This distance is equal to one-half of the width J of the rim 2 as defined by the customary standards. The radial carcass reinforcement 3 reaches in the sidewall 7 a maximum axial distance $W_1$ which is greater than the distance $W_o$ reached in the sidewall 8 with respect to the median plane XX' of the beads 5.

When the tire 1 is inflated to rated pressure, its entire crown swings in the direction towards the median plane XX', as shown in dotted line, so that the normal N to the tread forms an angle $\gamma$ of a few degrees with the median plane XX' of the beads 5, which is particularly harmful to the life of the tire 1. The median plane XX' of the beads 5 is perpendicular to the axis of rotation (not shown) of the tire 1.

FIG. 2 shows a tire 10 in accordance with the invention, mounted on a rim 11, inflated but not under load. The bead seats 11' on the rim 11 have the same diameter D. However, the invention also concerns tires of the type claimed whose bead eats have—as known per se—different diameters. The radial carcass reinforcement 12 and the tread reinforcement 13 have the same characteristics as those of the tire 1 of FIG. 1. The single-ply radial carcass reinforcement 12 of steel cables comprises two portions 12' and 12" without interruption which reinforce the sidewalls 14 and 15, respectively. The developed length of the portion 12" contained between the bead ring 17 and the median plane XX' of the beads is greater than the developed length of the portion 12' present between the bead ring 16 and the median plane XX'. The maximum axial distance $W_1$ of the portion 12" from the median plane XX' of the beads is greater than the maximum axial distance $W_o$ of the portion 12'. The radial height of the radial carcass reinforcement 12 with respect to the bead seats 11' as defined by the standards is designated by H.

In a zone of width L less than the overall width L' of the tread reinforcement 13, the radial carcass reinforcement 12 and the tread reinforcement 13 have a slight meridian curvature, preferably at most equal to the circumferential curvature of the crown of the tire 10, and are substantially parallel to each other.

The tread reinforcement 13 is formed of two superimposed crossed plies 13' and 13" which form angles of 25° with the longitudinal direction of the tire. On the side of the median plane XX' of the beads corresponding to the portion 12" of the radial carcass reinforcement 12, in the area between the radial carcass reinforcement 12 and the tread reinforcement 13 there is arranged, parallel to the radial carcass reinforcement 12, the swing-limiting block 18 in accordance with the invention. This swing-limiting block 18 is formed of two superimposed plies 18' and 18" of different width, composed of steel wires or cables of low extensibility arranged contiguous to each other and forming an angle of an absolute value of 8° with the longitudinal direction of the tire 10, so that this swing-limiting block 18 avoids the swinging of the tread reinforcement 13.

The median plane (of trace YY' in the plane of the drawing) of the tread reinforcement 13 has, after inflation of the tire, remained parallel to the median plane XX' of the beads. The swing-limiting block 18 can also be formed of at least one ply of steel cables of low extensibility which are parallel to the longitudinal direction or of steel cables of low extensibility which are wound parallel to the longitudinal direction.

The expansion-limiting block 19, like the swing-limiting block 18, is arranged between the radial carcass reinforcement 12 and the tread reinforcement 13 parallel to the radial carcass reinforcement 12 and on the inside of the zone of parallelism of width L. However, the expansion-limiting block 19 is located on the side of the median plane XX' of the beads opposite that in which the swing-limiting block 18 is located.

The width C of the swing-limiting block 18 is equal here to about 33% of the width L of the zone of parallelism. The axially outer edge 18''' of the swing-limiting block 18 is located within the zone L. The ply 18' has a width which differs by less than 10% from the width of the ply 18''. The axial distance B of the longitudinal axis m of the swing-limiting block 18 from the median plane XX' of the beads is equal to about 50% of the maximum distance $W_1$ from the longest portion 12'' of the radial carcass reinforcement 12 to the median plane XX'.

The expansion-limiting block 19 is formed of two superimposed crossed plies 19' and 19'' whose steel wires or cables of low extensibility are arranged contiguous to each other and form an angle of 10° in absolute value with the circumferential direction of the tire 10. The width D of this expansion-limiting block 19 is equal to about 17% of the width L of the area of parallelism. The width of the ply 19'' differs by less than 10% from the width of the ply 19'. The axially outer edge 19''' of the expansion-limiting block 19 is arranged within the zone of parallelism L. The axial distance A between the longitudinal median axis m' of the expansion-limiting block 19 and the median plane XX' of the beads is equal to about 22% of the distance $W_o$.

Moreover, it is advantageous, in particular to facilitate the manufacture and the putting in place, to combine in a single limiting block 20 (FIG. 3) the swing-limiting block 18 and the expansion-limiting block 19. This single limiting block 20 is formed of two superimposed plies 20' and 20'' which are continuous from one edge 21 to the other edge 22 and crossed at the angles contemplated (8° or 10°) for the plies 18', 18'' and 19', 19'' which form the limiting blocks 18 and 19. Moreover, the single limiting block 20 satisfies the same preferential characteristics as those contemplated for the two separate limiting blocks 18 and 19, namely in particular:

(a) arrangement within the zone of parallelism of width L between the radial carcass reinforcement 12 and the tread reinforcement 13, and (b) arrangement of the edges 21 and 22 of the single limiting block 20 within the zone of parallelism of width L and at distances from the limits of said zone of between 0 and 30% of the width L.

In general, the median axis M of the single limiting block 20 is axially on the side of the median plane XX' of the beads which corresponds to the sidewall 15 in which the radial carcass reinforcement 12 reaches its greatest maximum axial distance $W_1$ from said median plane XX' of the beads.

FIG. 4 shows a (swing- or expansion- or single) limiting block formed of a folded ply 40 whose edges 40' and 40'' meet along a parallel circle.

FIG. 5 shows a (swing- or expansion- or single) limiting block formed of a single ply 50 which is folded on itself along its median line. The fold 50' is arranged axially outwards with respect to the median plane XX' of the beads.

It is understood that the limiting blocks 18, 19 and 20 of the type described with reference to FIGS. 2A, 2B and 3 could be replaced by limiting blocks of the type described with reference to FIGS. 4 and 5.

It is also useful to employ limiting blocks 18, 19 or limiting block 20 consisting of two crossed plies 18', 18'' and 19', 19'' or 20', 20'', the wires or cables of each limiting block making different angles α in absolute value while remaining of opposite sign. The advantage of such asymmetrical arrangement is to correct, if necessary, lateral (axial) nonuniformity thrusts induced by the tread reinforcement 13, or to prevent, especially in cases where relatively wide limiting blocks 18, 19 or limiting block 20 are used, the generation of such nonuniformity thrusts by the limiting blocks 18, 19 or limiting block 20 themselves. These thrusts may disturb the vehicle behavior and cause uneven wear of the tread.

In fact, limiting blocks 18, 19 or limiting block 20 formed by two symmetrically disposed plies 18', 18'' and 19', 19'' or 20', 20'' (e.g., at angles $+\alpha$ and $-\alpha$) basically generate such harmful thrusts, because the two plies 18', 18'' and 19', 19'' or 20', 20'' are not located at the same distance from the axis of rotation of the tire 10. Consequently, limiting blocks 18, 19 or limiting block 20 which do not generate lateral thrusts have their wires or cables disposed at asymmetrical angles α. By preference, the limiting block-ply 18', 19' or 20', the wires or cables of which are oriented at the greater angle should be disposed radially inside the other ply 18'', 19'' or 20''. A satisfactory angular arrangement is thus 8° for the radially inner ply 18', 19' or 20' and 3° for the radially outer ply 18'', 19'' or 20''.

When limiting blocks 18, 19 are formed by two symmetrically disposed plies, the absolute value of angle α is preferably between 5° and 10°.

What is claimed is:

1. A tire with a radial carcass reinforcement anchored on both sides to at least one bead ring and with a tread reinforcement of slight meridian curvature which is parallel to the radial carcass reinforcement along a zone of a width less than or equal to that of the tread reinforcement and formed of at least two superimposed plies of wires or cables parallel in each ply and crossed from one ply to the other forming angles at most equal to 45° with the longitudinal direction of the tire, the maximum axial distance of the radial carcass reinforcement from the median plane of the beads being greater for one sidewall than for the other sidewall of the tire, the tire being mounted on a rim and inflated but not under load, characterized by the fact that parallel to the radial carcass reinforcement and between the radial carcass reinforcement and the tread reinforcement there are arranged a swing-limiting block and an expansion-limiting block which are each formed of at least one ply of wires or cables of low extensibility parallel to the longitudinal direction or preferably each formed of two superimposed plies of wires or cables of low extensibility which are parallel to each other in each ply and crossed from one ply to the other forming with the longitudinal direction angles of opposite sign, each being both other than zero and less in absolute value than one-half of the smallest angle used in the tread reinforcement, the longitudinal median axis of the swing-limiting block being located axially on the side of the median plane of the beads of the tire corresponding to the sidewall in which the radial carcass reinforcement reaches its greatest maximum axial distance from the median plane of the beads, the longitudinal median axis of the expansion-limiting block being located axially on the side of the median plane of the beads corresponding to the sidewall in which the radial carcass reinforcement reaches its smallest maximum axial distance from the median plane of the beads and further characterized by the fact that the wires or cables of the limiting blocks, which are preferably of steel, have a relative elongation less than 0.2% under a load equal to 10% of their rupture load.

2. The tire according to claim 1, characterized by the fact that the opposite angles formed by the wires or cables of the two plies of each limiting block are asymmetrical with the longitudinal direction of the tire.

3. The tire according to claim 2, characterized by the fact that the wires or cables of the radially inner ply of each limiting block form a greater angle than that of the wires or cables of the radially outer ply of the same limiting block.

4. The tire according to claim 3, characterized by the fact that the angle of the wires or cables of the radially inner ply is 8° and the angle of the wires or cables of the radially outer ply is 3° in absolute value.

5. The tire according to claim 1, characterized by the fact that the opposite angles formed by the wires or cables of the two plies of each limiting block are symmetrical with the longitudinal direction of the tire.

6. The tire according to claim 5, characterized by the fact that the absolute values of the opposite symmetrical angles formed with the longitudinal direction by the wires or cables of the two crossed plies of the limiting blocks are between 5° and 10°.

7. The tire according to claim 2 or claim 5, characterized by the fact that the limiting blocks are arranged along zones included within the zone along which the tread reinforcement is parallel to the radial carcass reinforcement.

8. The tire according to claim 2 or claim 5, characterized by the fact that the cables of the limiting blocks have a cable lay between 12 and 20 times the apparent diameter of the cable.

9. The tire according to claim 2 or claim 5, characterized by the fact that the wires or cables of the limiting blocks are arranged contiguous to each other.

10. The tire according to claim 2 or claim 5, characterized by the fact that the width of the swing-limiting block is between 15% and 60% of the width of the zone along which the tread reinforcement is parallel to the radial carcass reinforcement.

11. The tire according to claim 2 or claim 5, characterized by the fact that the width of the expansion-limiting block is between 10% and 30% of the width of the zone along which the tread reinforcement is parallel to the radial carcass reinforcement.

12. The tire according to claim 2 or claim 5, characterized by the fact that the longitudinal median axis of the swing-limiting block is located at an axial distance from the median plane of the beads which is between 10% and 50% of the maximum axial distance of the radial carcass reinforcement of the sidewall which has the greatest maximum axial distance from the median plane of the beads.

13. The tire according to claim 7, characterized by the fact that the axially outer edge of the swing-limiting block is located axially within the zone along which the tread reinforcement is parallel to the radial carcass reinforcement, the axially outer edge being preferably placed at a distance from the edge of the said zone which is between 0 and 30% of the width of said zone.

14. The tire according to claim 7, characterized by the fact that the axially outer edge of the expansion-limiting block is located axially within the zone along which the tread reinforcement is parallel to the radial carcass reinforcement, the axially outer edge being preferably placed at a distance from the edge of said zone which is between 0 and 30% of the width of said zone.

15. The tire according to claim 2 or claim 5, characterized by the fact that the swing-limiting block is formed of two plies, the widths of which differ from each other by at most 10%.

16. The tire according to claim 5, characterized by the fact that the swing-limiting block is formed of a folded ply whose edges meet along a parallel circle.

17. The tire according to claim 5, characterized by the fact that the swing-limiting block is formed of a ply which is folded on itself and the fold of which corresponds to the axially outer edge of this block.

18. The tire according to claim 2 or claim 5, characterized by the fact that the expansion-limiting block is formed of two plies, the widths of which differ from each other by at most 10%.

19. The tire according to claim 5, characterized by the fact that the expansion-limiting block is formed of a folded ply whose edges meet along a parallel circle.

20. The tire according to claim 5, characterized by the fact that the expansion-limiting block is formed of a ply which is folded on itself and the fold of which corresponds to the axially outer edge of this block.

21. A tire with a radial carcass reinforcement anchored on both sides to at least one bead ring and with a tread reinforcement of slight meridian curvature which is parallel to the radial carcass reinforcement along a zone of a width less than or equal to that of the tread reinforcement and formed of at least two superimposed plies of wires or cables parallel in each ply and crossed from one ply to the other forming angles at most equal to 45° with the longitudinal direction of the tire, the maximum axial distance of the radial carcass reinforcement from the median plane of the beads being greater for one sidewall than for the other sidewall of the tire, the tire being mounted on a rim and inflated but not under load, characterized by the fact that parallel to the radial carcass reinforcement and between the radial carcass reinforcement and the tread reinforcement there is arranged a single limiting block formed of at least one ply of wires or cables of low extensibility parallel to the longitudinal direction or is preferably formed of two superimposed plies of wires or cables of low extensibility which are parallel to each other in each ply and crossed from one ply to the other forming with the longitudinal direction angles of opposite sign, each being both other than zero and less in absolute value than one-half of the smallest angle used in the tread reinforcement, the longitudinal median axis of this single limiting block being located axially on the side of the median plane of the beads of the tire corresponding to the sidewall in which the radial carcass reinforcement reaches its greatest maximum axial distance from the median plane of the beads and further characterized by the fact that the wires or cables of the single limiting block, which are preferably of steel, have a relative elongation less than 0.2% under a load equal to 10% of their rupture load.

22. The tire according to claim 21, characterized by the fact that the opposite angles formed by the wires or cables of the two plies of the single limiting block are asymmetrical with the longitudinal direction of the tire.

23. The tire according to claim 22, characterized by the fact that the wires or cables of the radially inner ply of the single limiting block form a greater angle than that of the wires or cables of the radially outer ply of the single limiting block.

24. The tire according to claim 23, characterized by the fact that the angle of the wires or cables of the radially inner ply is 8° and the angle of the wires or cables of the radially outer ply is 3° in absolute value.

25. The tire according to claim 21, characterized by the fact that the opposite angles formed by the wires or cables of the two plies of the single limiting block are symmetrical with the longitudinal direction of the tire.

26. The tire according to claim 25, characterized by the fact that the absolute values of the opposite symmetrical angles formed with the longitudinal direction by the wires or cables of the crossed plies of the single-limiting block are between 5° and 10°.

27. The tire according to claim 22 or claim 25, characterized by the fact that the single limiting block is arranged within the zone along which the tread reinforcement is parallel to the radial carcass reinforcement.

28. The tire according to claim 27, characterized by the fact that the edges of the single limiting block are arranged at distances from the limits of said zone of parallelism which are between 0 and 30% of the width of said zone.

29. The tire according to claim 22 or claim 25, characterized by the fact that the cables of the single limiting block have a cable lay between 12 and 20 times the apparent diameter of the cable.

30. The tire according to claim 222 or claim 25, characterized by the fact that the wires or cables of the single limiting block are arranged contiguous to each other.

31. The tire according to claim 22 or claim 25, characterized by the fact that the single limiting block is formed of two plies, the widths of which differ from each other by at most 10%.

32. The tire according to claim 25, characterized by the fact that the single limiting block is formed of a folded ply whose edges meet along a parallel circle.

33. The tire according to claim 25, characterized by the fact that the single limiting block is formed of a ply which is folded on itself and the fold of which is located on the side of the single limiting block which is furthest from the median plane of the beads.

34. The tire according to claim 1 or claim 21, characterized by the fact that the beads of the tire have the same diameter and by the fact that the portion of the radial carcass reinforcement which is contained between one bead and the median plane of the beads and which has the greatest length reaches the greatest maximum axial distance from the median plane of the beads as compared with the other portion of the radial carcass reinforcement contained between the other bead and the median plane.

35. The tire according to claim 1 or claim 21, characterized by the fact that the radial carcass reinforcement is formed of a single ply of steel cables.

* * * * *